United States Patent Office 3,244,711
Patented Apr. 5, 1966

3,244,711
7-(s-TRIAZINYLAMINO)-3-ARYL-COUMARIN BRIGHTENING AGENTS
Otto Berendes and Heinrich Gold, Cologne-Stammheim, and Carl-Wolfgang Schellhammer, Opladen, Germany, assignors to Farbenfabriken Bayer Aktiengesellschaft, Leverkusen, Germany, a corporation of Germany
No Drawing. Filed May 12, 1965, Ser. No. 455,290
Claims priority, application Germany, May 23, 1964, F 42,972
5 Claims. (Cl. 260—249.5)

The present invention relates to brightening agents of the coumarin series; more particularly it concerns brightening agents which consist essentially of almost colourless blue-fluorescent 7-(s-triazinylamino)-3-aryl-coumarin compounds of the general formula

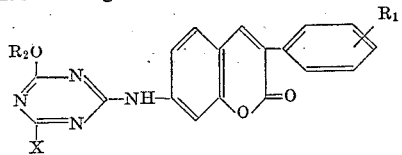

in which $R_1$ denotes hydrogen, a lower alkyl radical, such as methyl or ethyl, a lower alkoxy group, such as methoxy or ethoxy, or halogen, especially chlorine, and $R_2$ means an alkyl, alkenyl, cycloalkyl, aralkyl or aryl radical, while X stands for chlorine or for the group $OR_3$, where $R_3$ denotes an alkyl, alkenyl, cycloalkyl, aralkyl or aryl radical.

The coumarin compounds of the above formula are suitable for brightening a great variety of materials, for example, for brightening textile materials of cellulose ester fibres and also polyamide, polyurethane, polyacrylonitrile and polyester fibres, furthermore for brightening leather and soaps; they are especially well suited for brightening synthetic resins, e.g. of polyvinyl chloride, and for brightening lacquers of cellulose esters or nitrocellulose.

The brightening agents of the present invention can be applied in the usual manner, either in the form of solutions in organic solvents or in the form of solutions or dispersions in water. The brightening agents can also be incorporated with casting or spinning masses which serve for the production of synthetic articles, such as foils, fibres, filaments, and the like. The amounts required for brightening can vary within wide limits and can easily be determined by preliminary experiments and lie, in general, far below 1%, referred to the weight of the material to be brightened.

Some of the coumarin compounds of the above general formula, which are to be used as brightening agents, are listed in the following table by way of example:

TABLE

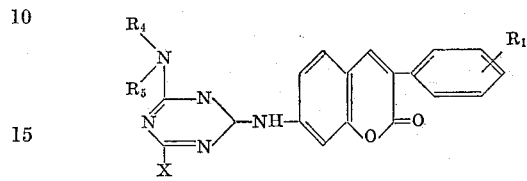

| | $R_1$ | $OR_2$ | X | Melting point in ° C. |
|---|---|---|---|---|
| (a) | H | $OC_2H_5$ | Cl | 230 |
| (b) | H | $OCH(CH_3)_2$ | Cl | 215 |
| (c) | H | $OCH_2CH_2OCH_3$ | Cl | 165 |
| (d) | H | $OCH_2-CH=CH_2$ | Cl | 218 |
| (e) | H | $OCH_2C_6H_5$ | Cl | 198 |
| (f) | H | $OCH_2CH_2OCH_3$ | $OCH_2CH_2OCH_3$ | 154–157 |
| (g) | H | $OCH(CH_3)_2$ | $OCH(CH_3)_2$ | 209–212 |
| (h) | H | $OCH_2CH_2OCH_3$ | $OCH_2CH_2CH_2CH_3$ | 143–145 |
| (i) | H | $OCH_2-CH=CH_2$ | $OCH_2-CH=CH_2$ | 190 |
| (k) | $CH_3$* | $OCH_2-CH=CH_2$ | Cl | 230–231 |
| (l) | Cl* | $OCH_2-CH=CH_2$ | Cl | 273 |

*In 4'-position.

The 7-(s-triazinylamino)-3-aryl-coumarin compounds are obtainable, for example, by condensing 1 mol cyanuric chloride with 1 mol 7-amino-3-aryl-coumarin and 1 or 2 mol of an alcohol, alkenol, cycloalkanol, aralkanol or phenol, in any sequence and in known manner, in the presence of an acid-binding agent.

In comparison with the already known brightening agents, the 7-(s-triazinylamino)-3-aryl-coumarin compounds of the general formula

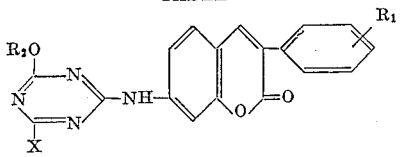

in which $R_1$ and X have the meaning given above, while $R_4$ and $R_5$ stand for hydrogen or hydrocarbon radicals, the brightening agents of the present invention are superior in that they lead to brightening effects which are faster to light and less greenish.

The following examples serve to illustrate the invention without, however, limiting its scope.

Example 1

1 gram of one of the coumarin compounds listed in the table under (e), (f) and (g) is incorporated on a roller with 1000 g. of opaque soft polyvinyl chloride. The material is then excellently brightened and exhibits a neutral white shade.

Example 2

1 gram of one of the coumarin compounds listed in the table under (c) and (d) is dissolved in 1000 g. of a colourless lacquer of cellulose acetate or nitrocellulose. The lacquer is then thinly spread on a colourless primary coat. After drying, the lacquer film is excellently brightened.

Example 3

A fabric of polyamide fibres is introduced in a liquor-to-goods ratio of 40:1 into an aqueous bath which contains, per litre, 1 g. oleyl sulphonate, 0.75 g. formic acid and 0.1 g. of the coumarin compound listed in the table under (d). The bath is then heated to 90–95° C. and kept at this temperature for 30–60 minutes, while the fabric is moderately moved about in the bath. The fabric is subsequently rinsed and dried. The textile material thus treated exhibits a very good neutral brightening effect.

Example 4

A fabric of cellulose acetate fibres is treated at 60° C. in the manner described in Example 3, but with the difference that the bath contains one of the coumarin compounds listed in the table under (c) and (f), instead of the coumarin compound listed under (d). The textile material thus treated exhibits a very good brightening effect.

We claim:
1. A compound of the formula

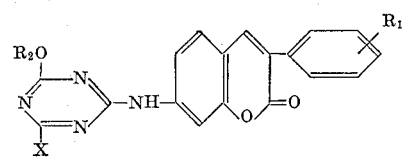

in which $R_1$ is a member selected from the group consisting of hydrogen, lower alkyl, and chloro; $R_2$ is a member selected from the group consisting of lower alkyl, beta lower alkoxy lower alkyl, lower alkenyl, and phenyl-substituted lower alkyl; and X is a member selected from the group consisting of chloro and —OR₃, wherein R₃ is a member selected from the group consisting of lower alkyl, lower alkenyl, and beta lower alkoxy alkyl.

2. A compound of the formula

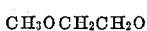
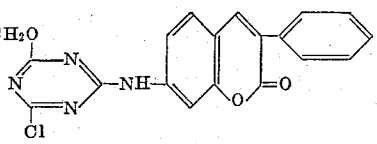

3. A compound of the formula

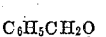
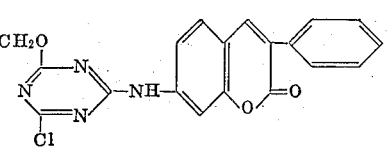

4. A compound of the formula

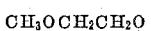
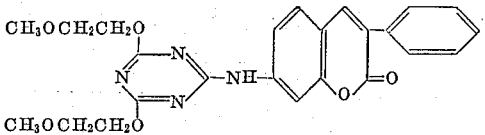

5. A compound of the formula

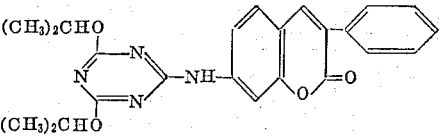

References Cited by the Examiner
UNITED STATES PATENTS
2,945,033  7/1960  Hausermann _____ 260—247.5

WALTER A. MODANCE, *Primary Examiner.*
J. M. FORD, *Assistant Examiner.*